(12) United States Patent
Mukherjee

(10) Patent No.: US 11,703,342 B2
(45) Date of Patent: Jul. 18, 2023

(54) RESILIENT VEHICLE ROUTE SYSTEM

(71) Applicant: BANK OF AMERICA CORPORATION, Charlotte, NC (US)

(72) Inventor: Maharaj Mukherjee, Poughkeepsie, NY (US)

(73) Assignee: Bank of America Corporation, Charlotte, NC (US)

(*) Notice: Subject to any disclaimer, the term of this patent is extended or adjusted under 35 U.S.C. 154(b) by 57 days.

(21) Appl. No.: 16/848,473

(22) Filed: Apr. 14, 2020

(65) Prior Publication Data

US 2021/0318134 A1 Oct. 14, 2021

(51) Int. Cl.
| | |
|---|---|
| *G01C 21/34* | (2006.01) |
| *G06Q 10/0835* | (2023.01) |
| *G08G 1/00* | (2006.01) |
| *G05D 1/02* | (2020.01) |
| *G06Q 10/047* | (2023.01) |
| *B60W 60/00* | (2020.01) |

(52) U.S. Cl.
CPC ... *G01C 21/3492* (2013.01); *B60W 60/00256* (2020.02); *G05D 1/0217* (2013.01); *G05D 1/0291* (2013.01); *G06Q 10/047* (2013.01); *G06Q 10/08355* (2013.01); *G08G 1/202* (2013.01); *G05D 2201/0213* (2013.01)

(58) Field of Classification Search
CPC .. G01C 21/3492; G08G 1/202; G05D 1/0291; G05D 1/0217; G05D 2201/0213; G06Q 10/08355; G06Q 10/047; B60W 60/00256
See application file for complete search history.

(56) References Cited

U.S. PATENT DOCUMENTS

| | | | |
|---|---|---|---|
| 7,415,019 | B2 | 8/2008 | Duggi |
| 7,450,517 | B2 | 11/2008 | Cho |
| 7,468,954 | B2 | 12/2008 | Sherman |
| 7,590,086 | B2 | 9/2009 | Olkkonen et al. |
| 7,668,119 | B2 | 2/2010 | Thubert et al. |
| 7,693,119 | B2 | 4/2010 | Lee et al. |

(Continued)

FOREIGN PATENT DOCUMENTS

CN 102855753 A * 1/2013

OTHER PUBLICATIONS

Translation of CN102855753A (Year: 2013).*

(Continued)

*Primary Examiner* — Rachid Bendidi
*Assistant Examiner* — Selena M Jin

(57) ABSTRACT

A delivery system in which the vehicles themselves coordinate their movements. Vehicles are assigned to groups based on proximity. Each vehicle communicates its location and route information to the other vehicles in the group. The vehicles in the group then know the positions and routes of the other vehicles in the group. When a delivery is requested, the vehicles in the group use this information to determine which vehicle should be assigned to make that delivery. As the vehicles move around, their proximity to each other changes. When a vehicle has moved away from a group, that vehicle may be removed from the group and assigned to a different group. In this manner, the vehicle coordination mechanism is a distributed task performed by all the vehicles.

20 Claims, 5 Drawing Sheets

(56) References Cited

U.S. PATENT DOCUMENTS

| | | |
|---|---|---|
| 7,697,456 B2 | 4/2010 | Ekl et al. |
| 7,788,387 B2 | 8/2010 | Kumar et al. |
| 7,792,059 B2 | 9/2010 | Fonseca, Jr. et al. |
| 7,808,960 B1 | 10/2010 | Chan et al. |
| 7,885,285 B2 | 2/2011 | Fukuyama |
| 7,970,933 B2 | 6/2011 | Osano et al. |
| 8,233,389 B2 | 7/2012 | Yim et al. |
| 8,446,124 B2 | 5/2013 | Nagy et al. |
| 8,488,545 B2 | 7/2013 | Chen et al. |
| 8,942,197 B2 | 1/2015 | Rudnick et al. |
| 9,036,635 B2 | 5/2015 | Pandey et al. |
| 9,391,891 B2 | 7/2016 | Liao et al. |
| 9,461,827 B2 | 10/2016 | Laberteaux et al. |
| 9,692,604 B2 | 6/2017 | Cordeiro De Oliveira Barros et al. |
| 9,773,410 B2 | 9/2017 | Vorona |
| 10,299,232 B2 | 5/2019 | Shen et al. |
| 10,383,005 B2 | 8/2019 | Lee et al. |
| 10,482,400 B2 | 11/2019 | Guo et al. |
| 2006/0133289 A1 | 6/2006 | Golle et al. |
| 2006/0291482 A1 | 12/2006 | Evans |
| 2007/0103342 A1* | 5/2007 | Milleville ............... G08G 1/202 340/988 |
| 2007/0223436 A1 | 9/2007 | Lenardi et al. |
| 2008/0002721 A1 | 1/2008 | Greene et al. |
| 2008/0040481 A1 | 2/2008 | Joshi et al. |
| 2011/0130114 A1 | 6/2011 | Boudville |
| 2011/0164527 A1 | 7/2011 | Mishra et al. |
| 2013/0060586 A1* | 3/2013 | Chen ...................... G06Q 10/02 705/5 |
| 2013/0188513 A1 | 7/2013 | Vasseur et al. |
| 2013/0282263 A1 | 10/2013 | Tee |
| 2015/0078243 A1 | 3/2015 | Zhang et al. |
| 2015/0092661 A1 | 4/2015 | Huang et al. |
| 2015/0230188 A1 | 8/2015 | Festag et al. |
| 2017/0046658 A1* | 2/2017 | Jones ...................... H04W 4/02 |
| 2017/0064503 A1* | 3/2017 | Navani .................. G08G 1/123 |
| 2017/0314948 A1* | 11/2017 | Racah .................... G01C 21/28 |
| 2018/0014342 A1 | 1/2018 | Hinz et al. |
| 2018/0054773 A1 | 2/2018 | d'Orey et al. |
| 2018/0143649 A1* | 5/2018 | Miao ..................... B60W 60/00 |
| 2018/0211186 A1* | 7/2018 | Rakah .................. G06V 20/593 |
| 2018/0211190 A1* | 7/2018 | Guo ................. G06Q 10/08355 |
| 2018/0315148 A1* | 11/2018 | Luo ................. G06Q 10/06313 |
| 2019/0051179 A1 | 2/2019 | Alvarez et al. |
| 2019/0259120 A1* | 8/2019 | Mattingly ............ G05D 1/0027 |
| 2019/0304296 A1 | 10/2019 | Basu et al. |
| 2019/0364459 A1 | 11/2019 | Lee |
| 2020/0013020 A1* | 1/2020 | Yang ................. G06Q 10/08355 |
| 2020/0043063 A1* | 2/2020 | London ............. G06Q 30/0281 |
| 2020/0082722 A1 | 3/2020 | Beiski |
| 2020/0130828 A1* | 4/2020 | Pandit .................. G08G 5/0043 |
| 2020/0168093 A1* | 5/2020 | Edwards ................ G08G 1/166 |
| 2020/0217673 A1* | 7/2020 | Bansal ............... G06Q 30/0613 |

OTHER PUBLICATIONS

Wikipedia; Vehicular ad-hoc network; https://en.wikipedia.org/wiki/vehicular_ad-hoc_network; 8 pages, Printed Apr. 13, 2020.

\* cited by examiner

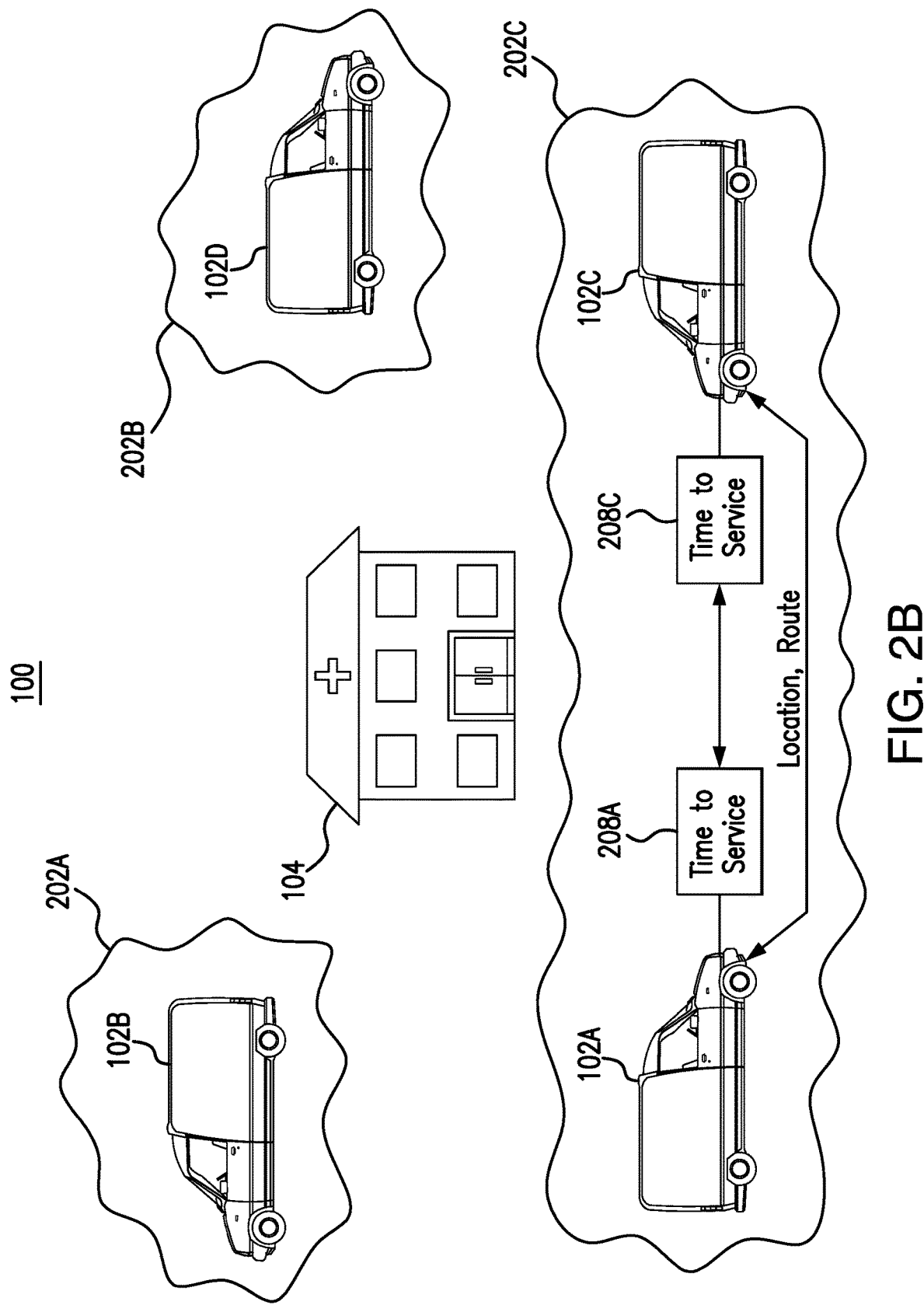

RESILIENT VEHICLE ROUTE SYSTEM

TECHNICAL FIELD

This disclosure relates generally to vehicle routing.

BACKGROUND

Vehicles may be used to deliver aid and supplies to destinations affected by natural disaster or other form of similar potential service and supply chain disruptions.

SUMMARY OF THE DISCLOSURE

Vehicles may be used to deliver aid and supplies to destinations affected by natural disaster or other form of similar potential service and supply chain disruptions. To avoid duplicating efforts and to improve the efficiency of the delivery efforts, the routes of the vehicles may be coordinated by a remote server. The server may track the locations and routes of each vehicle and issue instructions to each vehicle to guide that vehicle to the next assigned destination. When a vehicle reaches its destination, it delivers the needed aid and supplies. The remote server then assigns a new destination to the vehicle and instructs the vehicle to travel to that destination. The remote server can coordinate the routes and destinations of the vehicles so that two vehicles do not travel to the same destination.

This remote model of coordinating vehicles has one significant drawback: the natural disaster may impact the remote server or the communications network between the server and the vehicles. In these instances, the vehicles may be stopped and/or grounded and delivery efforts may cease. Thus, these remote systems are susceptible to significant disruptions during natural disasters.

This disclosure contemplates a delivery system in which the vehicles themselves coordinate their movements. Vehicles are assigned to groups based on proximity. Each vehicle communicates its location and route information to the other vehicles in the group. The vehicles in the group then know the positions and routes of the other vehicles in the group. When a delivery is requested, the vehicles in the group use this information to determine which vehicle should be assigned to make that delivery. As the vehicles move around, their proximity to each other changes. When a vehicle has moved away from a group due to lack of communication or otherwise, that vehicle may be removed from the group and assigned to a different group of one or more vehicles. In this manner, the vehicle coordination mechanism is a distributed task performed by all the vehicles. As a result, the resiliency of the system is improved because even if certain vehicles are taken down by the natural disaster, the other vehicles can still coordinate the delivery efforts. Certain embodiments are described below.

According to an embodiment, a system includes a first device and a second device. The first device is assigned to a first vehicle. The first device includes a first memory and a first hardware processor communicatively coupled to the first memory. The first memory stores a first location and a first route of the first vehicle. The second device is assigned to a second vehicle. The second device includes a second memory and a second hardware processor communicatively coupled to the second memory. The second memory stores a second location and a second route of the second vehicle. The first hardware processor receives a request from a destination and in response to receiving the request, determines, based on the first location and the first route, a first time for the first vehicle to service the destination. The second hardware processor receives the request from the destination and in response to receiving the request, determine, based on the second location and the second route, a second time for the second vehicle to service the destination. The second hardware processor also determines, based on the first time and the second time, that the first vehicle rather than the second vehicle should service the destination. The first hardware processor also determines, based on the first time and the second time, that the first vehicle rather than the second vehicle should service the destination and in response to determining that the first vehicle should service the destination, determines directions to navigate the first vehicle to the destination.

According to another embodiment, a method includes storing, by a first memory of a first device, a first location and a first route of a first vehicle. The first device is assigned to the first vehicle. The first device includes a first hardware processor communicatively coupled to the first memory. The memory also includes storing, by a second memory of a second device, a second location and a second route of a second vehicle. The second device is assigned to the second vehicle. The second device includes a second hardware processor communicatively coupled to the second memory. The memory also includes receiving, by the first hardware processor, a request from a destination and in response to receiving the request, determining, by the first hardware processor and based on the first location and the first route, a first time for the first vehicle to service the destination. The method further includes receiving, by the second hardware processor, the request from the destination and in response to receiving the request, determining, by the second hardware processor and based on the second location and the second route, a second time for the second vehicle to service the destination. The method also includes determining, by the second hardware processor and based on the first time and the second time, that the first vehicle rather than the second vehicle should service the destination, determining, by the first hardware processor and based on the first time and the second time, that the first vehicle rather than the second vehicle should service the destination, and in response to determining that the first vehicle should service the destination, determining, by the first hardware processor, directions to navigate the first vehicle to the destination.

According to another embodiment, an apparatus includes a first memory and a first hardware processor communicatively coupled to the first memory. The first memory stores a first location and a first route of a first vehicle. The first hardware processor receives a request from a destination and in response to receiving the request, determine, based on the first location and the first route, a first time for the first vehicle to service the destination. The first hardware processor also receives, from a second hardware processor, a second time for a second vehicle to service the destination. The second time is determined based on a second location and a second route of the second vehicle. The first hardware processor further determines, based on the first time and the second time, that the first vehicle rather than the second vehicle should service the destination and in response to determining that the first vehicle should service the destination, determines directions to navigate the first vehicle to the destination.

Certain embodiments provide one or more technical advantages. For example, an embodiment improves the resiliency of a delivery system by shifting the coordination efforts to the vehicles themselves. Certain embodiments may include none, some, or all of the above technical advantages.

One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which:

FIGS. 2A and 2B illustrate an example delivery using the system of FIG. 1;

DETAILED DESCRIPTION

Embodiments of the present disclosure and its advantages are best understood by referring to FIGS. 1 through 4 of the drawings, like numerals being used for like and corresponding parts of the various drawings.

Vehicles may be used to deliver aid and supplies to destinations affected by natural disaster or other form of similar potential service and supply chain disruptions. To avoid duplicating efforts and to improve the efficiency of the delivery efforts, the routes of the vehicles may be coordinated by a remote server. The server may track the locations and routes of each vehicle and issue instructions to each vehicle to guide that vehicle to the next assigned destination. When a vehicle reaches its destination, it delivers the needed aid and supplies. The remote server then assigns a new destination to the vehicle and instructs the vehicle to travel to that destination. The remote server can coordinate the routes and destinations of the vehicles so that two vehicles do not travel to the same destination.

This remote model of coordinating vehicles has one significant drawback: the natural disaster may impact the remote server or the communications network between the server and the vehicles. In these instances, the vehicles may be stopped and/or grounded and delivery efforts may cease. Thus, these remote systems are susceptible to significant disruptions during natural disasters.

This disclosure contemplates a delivery system in which the vehicles themselves coordinate their movements. Vehicles are assigned to groups based on proximity. Each vehicle communicates its location and route information to the other vehicles in the group. The vehicles in the group then know the positions and routes of the other vehicles in the group. When a delivery is requested, the vehicles in the group use this information to determine which vehicle should be assigned to make that delivery. As the vehicles move around, their proximity to each other changes. When a vehicle has moved away from a group due to lack of communication or otherwise, that vehicle may be removed from the group and assigned to a different group of one or more vehicles. In this manner, the vehicle coordination mechanism is a distributed task performed by all the vehicles. As a result, the resiliency of the system is improved because even if certain vehicles are taken down by the natural disaster, the other vehicles can still coordinate the delivery efforts.

A practical application of the disclosed system is that the system routes delivery vehicles to destinations while improving the resiliency of the system against disruptions, such as natural disasters. By allowing the vehicles themselves to coordinate their movements, the system can remain operational even if some of the vehicles are disrupted by a natural disaster. The system will be described in more detail using FIGS. 1 through 4.

Figure 1:
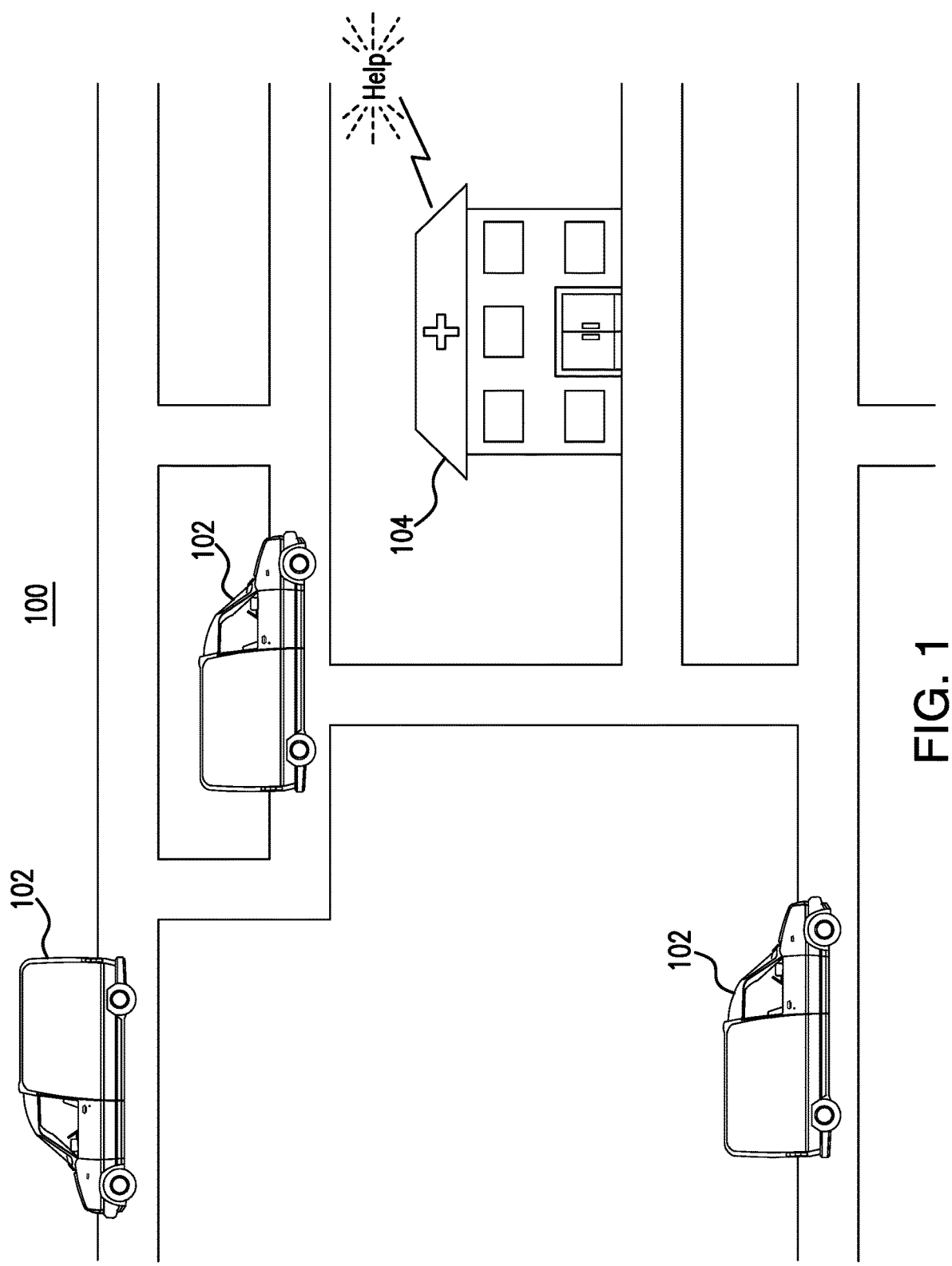
FIG. 1 illustrates an example system.

FIG. 1 illustrates an example system 100. As seen in FIG. 1, system 100 includes one or more vehicles 102 and one or more destinations 104. Generally, vehicles 102 travel through system 100 to one or more destinations 104. For example, vehicles 102 may deliver aid and/or supplies to one or more destinations 104. In particular embodiments, vehicles 102 coordinate their movements to one or more destinations 104 thereby improving the resiliency of system 100 during natural disasters. This disclosure contemplates system 100 including any suitable number of vehicles 102 and destinations 104.

Vehicles 102 travel through system 100 to one or more destinations 104. Vehicles 102 may be used to make deliveries to one or more destinations 104. This disclosure contemplates vehicles 102 making any suitable deliveries to destination 104. For example, vehicles 102 may deliver supplies and/or aid to destination 104. Vehicle 102 may be an automobile, a truck, a bicycle, a motorcycle, a semi-truck, or any other suitable form of transportation for making deliveries. Vehicles 102 may be autonomous, driverless vehicles 102, or vehicles 102 may be operated by a driver.

In certain embodiments, a vehicle 102 includes a device that coordinates the movement of vehicle 102. For example, the device may be a driver's mobile device that provides instructions to the driver regarding where to navigate vehicle 102. As another example, a device may be integrated into vehicle 102 and may control the movements of vehicle 102 (e.g., a control system for an autonomous vehicle 102). The device may communicate with other devices in other vehicles 102 to coordinate the movements of the vehicles 102. For example, the device may communicate a vehicle's 102 location and route to other vehicles 102. The device may also receive the locations and routes of other vehicles 102. The device may use this information to determine which vehicle 102 should make a delivery to a destination 104. Additionally, the device may retrieve directions (e.g., from an online map service) used to navigate the vehicle 102 to a destination 104. The device will be described in more detail using FIG. 4.

System 100 includes one or more destinations 104. Each destination 104 represents a location or site within system 100 that is serviced by a vehicle 102. In the illustrated example of FIG. 1, destination 104 is a clinic or hospital that is requesting aid and/or supplies. In response to communicating the request for aid or supplies, the clinic or hospital anticipates that a vehicle 102 will deliver the requested aid and/or supplies. This disclosure contemplates destination 104 being any suitable location for receiving deliveries from vehicle 102. For example, destination 104 may be a home, a storefront, a warehouse, a clinic, a hospital, a restaurant, an office, etc. Destination 104 issues requests, and vehicles 102 make deliveries to destination 104 in response to those requests.

Generally, vehicles 102 in system 100 may travel to destination 104 to make deliveries. It is usually not necessary, however, for every vehicle 102 in system 100 to make a delivery to destination 104 in response to a request. Typically, only one vehicle 102 should make a delivery to destination 104 in response to a request. Vehicles 102 coordinate their movements and deliveries in system 100. Generally, vehicles 102 are grouped or clustered based on proximity. The vehicles 102 in a group or cluster communicate their locations and routes to each other. The vehicles 102 then determine which vehicle 102 in the group or cluster should be assigned to respond to a particular request from destination 104. As the vehicles 102 move through system 100, the vehicles 102 may leave and enter other groups or clusters. In certain embodiments, because the vehicles 102 coordinate their own movements and deliveries, the resiliency of system 100 is improved over other systems that coordinate the movements of vehicles 102 using a remote server. The coordination of vehicles 102 will be described in more detail using FIGS. 2A, 2B, and 3.

Figure 2A:
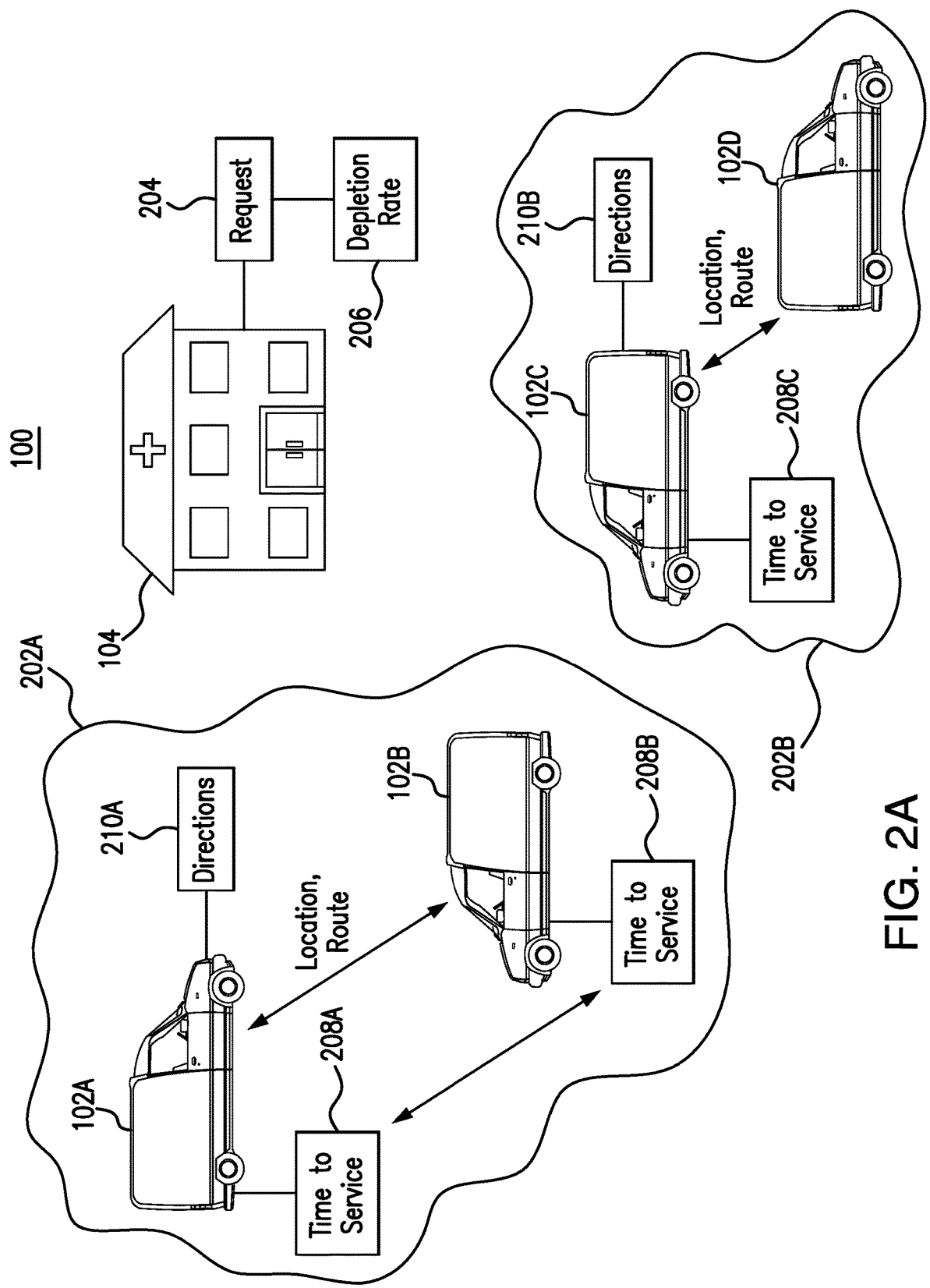

FIGS. 2A and 2B illustrate an example delivery using the system 100 of FIG. 1. Generally, the vehicles 102 in system 100 coordinate their movements to make a delivery to a destination 104. In certain embodiments, because the vehicles 102 coordinate their own movements through system 100, the delivery system is more resilient during natural disasters relative to a system that coordinates vehicles 102 using a remote server.

Destination 104 issues a request 204 that indicates a delivery should be made to destination 104. Destination 104 may broadcast request 204 to vehicles 102 within the vicinity of destination 104. Request 104 may be, for example, a request for aid or supplies to be delivered to destination 104. The vehicles 102 that are near destination 104 may receive request 204 and begin coordinating a delivery to destination 104. In certain embodiments, destination 104 may include information within request 204 that the vehicles 102 can use to coordinate the delivery. For example, request 204 may include information that identifies destination 104 and provides an address for destination 104. Request 204 may also indicate the requested item or service to be delivered. In certain embodiments, request 204 also includes a depletion rate 206 that indicates a rate at which a delivered item or service is being used or depleted at destination 104. Vehicles 102 may use this information to coordinate the delivery to destination 104.

Vehicles 102 may be clustered into groups 202 based on one or more factors. For example, vehicles 102 may be assigned to a group 202 based on their relative proximities to one another. In the example of FIG. 2A, vehicles 102A and 102B are assigned to group 202A, because vehicles 102A and 102B are close to one another. Vehicles 102C and 102D are assigned to group 202B, because vehicles 102C and 102D are fairly close to one another. Vehicles 102 may be assigned to groups 202 based on any suitable factor. For example, vehicles 102 may be assigned to a particular group based on the proximity of the vehicles 102 to one another, the types of vehicles 102 (e.g., to maintain a diverse mix of vehicles in a group 202), the amount of time the vehicles 102 have been on the road (e.g., to maintain a diverse mix of vehicles 102 with different amounts of usage to accommodate for vehicle servicing/maintenance), etc. The example groups 202 of FIGS. 2A and 2B, include a limited number of vehicles for the purposes of clarify. Each group 202 may include any suitable number of vehicles 102.

Groups 202 may be dynamic—vehicles 102 may leave a group 202 and join another group 202 as circumstances change. For example, as vehicle 102A drives further away from the vehicles 102 in group 202A, vehicle 102A may leave group 202A. If vehicle 102A does not locate another group 202 to join, vehicle 102A may create a new group 202 and be assigned to that new group 202. When another vehicle 102 or group 202 moves within proximity of vehicle 102A, that vehicle 102 or group 202 may join the new group 202 created by vehicle 102A or vehicle 102A may join the group 202 of that vehicle 102. Vehicles 102 may leave or join groups 202 based on any suitable factors. Using the previous example, vehicle 102A may leave group 202A or create/join another group 202 based on a vehicle type of vehicle 102A and/or the amount of time vehicle 102A has been on the road.

Vehicles 102, within a group 202, communicate information to one another to coordinate movement. For example, the vehicles 102 in a group 202 may communicate their locations and routes to one another. These locations and routes may be stored by vehicles 102 (e.g., within a memory of a device in vehicle 102). As a result, the vehicles 102 within a group 202 may be kept aware of the locations and routes of every other vehicle 102 within the group 202. Vehicles 102 in the same group 202 may have the same information. In the example of FIG. 2A, vehicles 102A and 102B communicate their locations and routes to one another, because they are assigned to the same group 202A. Vehicles 102C and 102D communicate their locations and routes to one another, because vehicles 102C and 102D are assigned to the same group 202B. As a result, vehicles 102A and 102B will know each other's locations and routes, and vehicles 102C and 102D will know each other's locations and routes. This information may be used later by the vehicles 102 to coordinate the delivery to destination 104. Vehicles 102 within a group 202 may communicate any suitable information with one another. For example, vehicles 102 may communicate location, routes, weather conditions experienced, traffic conditions experienced, etc. with other vehicles 102 in a group 202.

Vehicles 102 that receive request 204 from destination 104 begin coordinating the response to request 204. In the example of FIG. 2A, vehicles 102A, 102B, and 102C receive request 204 from destination 104 due to their proximity to destination 104. Vehicle 102D does not receive request 204 because vehicle 102D may be too far from destination 104 to have received request 104. The vehicles 102 that receive request 204 calculate a time 208 for that vehicle 102 to make a delivery to destination 104. In the example of FIG. 2A, vehicle 102A determines a time to service 208A, vehicle 102B determines a time to service 208B, and vehicle 102C determines a time to service 208C. Each time to service 208 may be determined based on one or more factors such as, for example, the distance between the vehicle 102 and destination 104, traffic conditions between vehicle 102 and destination 104, weather conditions, the time remaining to service a currently assigned route, etc. In some instances, a vehicle 102 may determine that it will take a long time for that vehicle 102 to service destination 104 and in other instances a vehicle 102 may determine that the vehicle 102 can quickly service destination 104. Vehicles 102 may communicate their time to service 208 to other vehicles 102 in the group 202. In the example of FIG. 2A, vehicle 102A communicates time to service 208A to vehicle 102B. Vehicle 102B communicates time to service 208B to vehicle 102A. Vehicle 102C may communicate time to service 208C to vehicle 102D.

The vehicles 102 in a group 202 then begin negotiating and coordinating the delivery effort to destination 104. The vehicles 102 may process the various times to service 208 of the vehicles 102 in the group 202 and agree that a particular vehicle 102 with a particular time to service 208 should service destination 104. The analysis to determine which vehicle 102 should make the delivery to destination 104 may involve any number of factors. For example, a simple approach would be for the vehicle 102 with the shortest time to service 208 to make the delivery to destination 104. A more complex approach may be to select the vehicle 102 that is on a route that will pass by destination 104 or bring vehicle 102 within a certain proximity of destination 104. Vehicles 102 may even reassign or exchange prior deliveries to other vehicles 102 so that a vehicle 102 that is geographically closest to destination 104 but is currently assigned to another route for another delivery, may instead be assigned the delivery to destination 104 and have another vehicle 102 in the group 202 take over the currently assigned route. Through this negotiation process, the vehicles 102 in a group 202 will collectively select a vehicle 102 to make the delivery to destination 104. In the example of FIG. 2A, vehicles 102A and 102C are selected out of their respective groups 202 to make the delivery to destination 104. In certain embodiments, to simplify the negotiation process, only the vehicles 102 that received request 204 from destination 104 may engage in the negotiation process within a group 202. As a result, vehicles 102 that were too far from destination 104 to receive request 204 do not waste time and resources calculating times to service 208 and/or negotiating the delivery. This simplification improves the speed at which a vehicle 102 is selected for making the delivery.

In certain embodiments, vehicles 102 also consider the depletion rate 206 to determine which vehicle should respond to request 204 by making the delivery. For example, it may be the case that, based on depletion rate 206, the vehicles 102 determine that destination 104 does not need a requested item or service urgently but rather, at a much later time. The vehicles 102 can then use that information to make a more informed decision as to which vehicle 102 should make the delivery. For example, even though a vehicle 102 has a long time to service 208 (e.g., because that vehicle 102 has another delivery assigned), that time to service 208 may not prevent the vehicle 102 from making the delivery to destination 104 before the requested item or service is completely depleted according to the depletion rate 206. Additionally, that vehicle 102 may be closer to destination 104 at the end of its currently assigned delivery than the other vehicles 102 in the group 202. In this instance, that vehicle 102 may be selected for the delivery.

In response to being selected to make the delivery, a vehicle 102 may determine directions 210 to navigate the vehicle 102 to the destination 104. Vehicle 102 may include a device (e.g., an integrated device or a driver's mobile phone) that retrieves these directions (e.g., from an online map service). In the example of FIG. 2A, vehicle 102A determines directions 210A to navigate vehicle 102A to destination 104. Vehicle 102C determines directions 210B to navigate vehicle 102C to destination 104. The vehicles 102 will then follow these directions 210 to destination 104 to make the delivery. For example, an integrated device may instruct an autonomous vehicle 102 how to navigate itself to destination 104. As another example, a driver's mobile device may provide audio and visual instructions that tell the driver how to navigate to destination 104.

Because vehicles 102A and 102C are in different groups 202A and 202B, vehicles 102A and 102C will not know that they are both heading towards destination 104 to make a delivery in response to request 204 when they start heading towards destination 104. If this conflict is not resolved, then a duplicative effort will be made to respond to request 204, which results in waste of time and resources in system 100. FIG. 2B shows an example of conflict resolution in system 100. As seen in FIG. 2B, vehicles 102A and 102C are heading towards destination 104. As these vehicles 102A and 102C move further away from the other vehicles 102 in their original groups 202A and 202B, the vehicles 102A and 102C may leave their groups 202A and 202B. Then, as the vehicles 102A and 102C move closer towards one another, vehicles 102A and 102C may merge into a group 202C. Vehicles 102A and 102C may join the same group 202 in any number of suitable ways. For example, as vehicles 102A and 102C move closer to one another, vehicle 102A may leave group 202A and join group 202B, which includes vehicle 102C, or vehicle 102C may leave group 202B and join group 202A, which includes vehicle 102A. As another example, vehicle 102A may leave group 202A and join group 202C without joining or creating a new group 202. Additionally, vehicle 102C may leave group 202B and join group 202A without joining or creating a new group 202

Once vehicles 102A and 102C join the same group 202C, vehicles 102A and 102C may begin exchanging information with one another because they are now in the same group 202C. For example, vehicles 102A and 102C may exchange location and route information with one another. Vehicles 102A and 102C may also exchange other information such as traffic conditions and weather conditions. Based on the information exchanged between vehicles 102A and 102C, vehicles 102A and 102C may determine that they are making a delivery to the same destination 104. As a result, vehicles 102A and 102C may recalculate their respective times to service 208A and 208C. Vehicles 102A and 102C may communicate their times to service 208 to one another to determine which vehicle 102A or 102C should make the delivery to destination 104. The determined vehicle 102 will then complete the delivery to destination 104, while the other vehicle 102 waits for another request to fulfill.

This disclosure contemplates vehicles 102 leaving or joining any group 202 in any suitable manner. Although the example of FIG. 2B shows vehicles 102A and 102C joining a new group 202C, it may be the case that vehicle 102C leaves group 202B and joins group 202A with vehicles 102A and 102B. It may be the case that vehicle 102A leaves group 202A and joins group 202B with vehicles 102C and 102D. The leaving and joining of one or more groups 202 may be done based on proximity and the example of FIG. 2B is not meant to limit the joining or leaving of groups 202.

Figure 3:
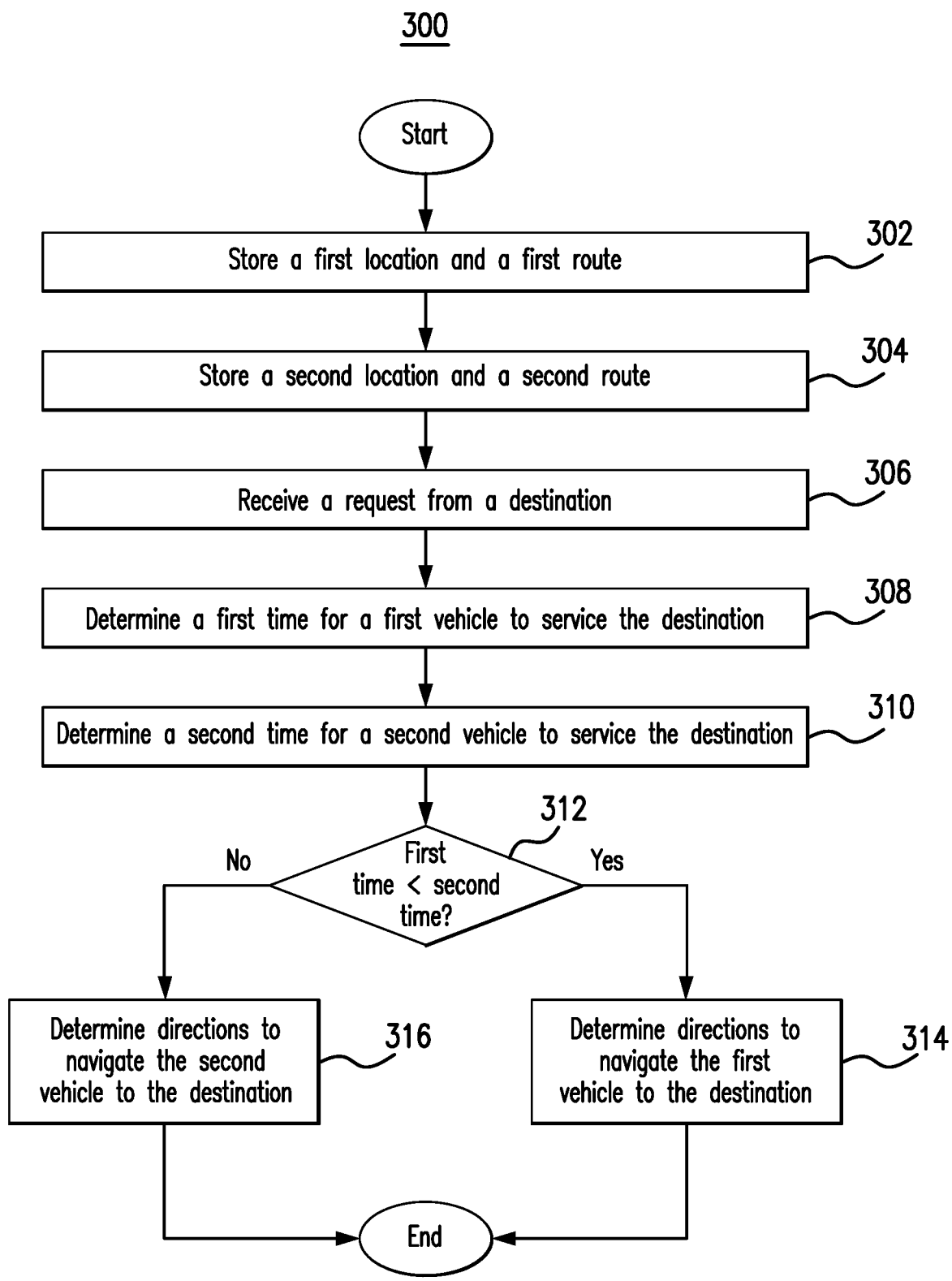
FIG. 3 is a flowchart illustrating a method of delivery using the system of FIG. 1.

FIG. 3 is a flowchart illustrating a method 300 of delivery using the system 100 of FIG. 1. Generally, one or more vehicles 102 or devices of the one or more vehicles 102 perform the steps of method 300. In particular embodiments, by performing method 300, a vehicle routing system is made more resilient against natural disasters relative to systems that use remote servers to coordinate vehicles 102.

A vehicle 102 stores a first location and a first route in step 302. A second vehicle 102 stores a second location and a second route in step 304. The first and second vehicles 102 may also communicate their locations and routes to one another if these vehicles 102 are assigned to the same group 202. In step 306, the first and second vehicles 102 receive a request 204 from a destination 104. The request 204 may indicate that destination 104 needs supplies or aid. In step 308, the first vehicle 102 determines a first time 208 for the first vehicle 102 to service the destination 104. In step 310, the second vehicle 102 determines a second time 208 for the second vehicle 102 to service the destination 104.

In step 312, the vehicles 102 analyze information to determine which vehicle 102 should respond to the request 204. In the example of FIG. 3, the vehicles 102 compare the times 208 to service the destination 104. If the time 208 to service for the first vehicle 102 is less than the time 208 to service for the second vehicle 102, then the first vehicle 102 is selected to make the delivery and the first vehicle 102 determines directions to navigate the first vehicle 102 to the destination 104 in step 314. If the time 208 to service for the first vehicle 102 is not less than the time 208 to service for the second vehicle 102, then the second vehicle 102 is selected to make the delivery and the second vehicle 102 determines directions 210 to navigate the second vehicle 102 to the destination 104 in step 316.

Modifications, additions, or omissions may be made to method 300 depicted in FIG. 3. Method 300 may include more, fewer, or other steps. For example, steps may be performed in parallel or in any suitable order. While discussed as vehicles 102 in system 100 performing the steps, any suitable component of system 100, such as devices within vehicles 102 for example, may perform one or more steps of the methods.

Figure 4:
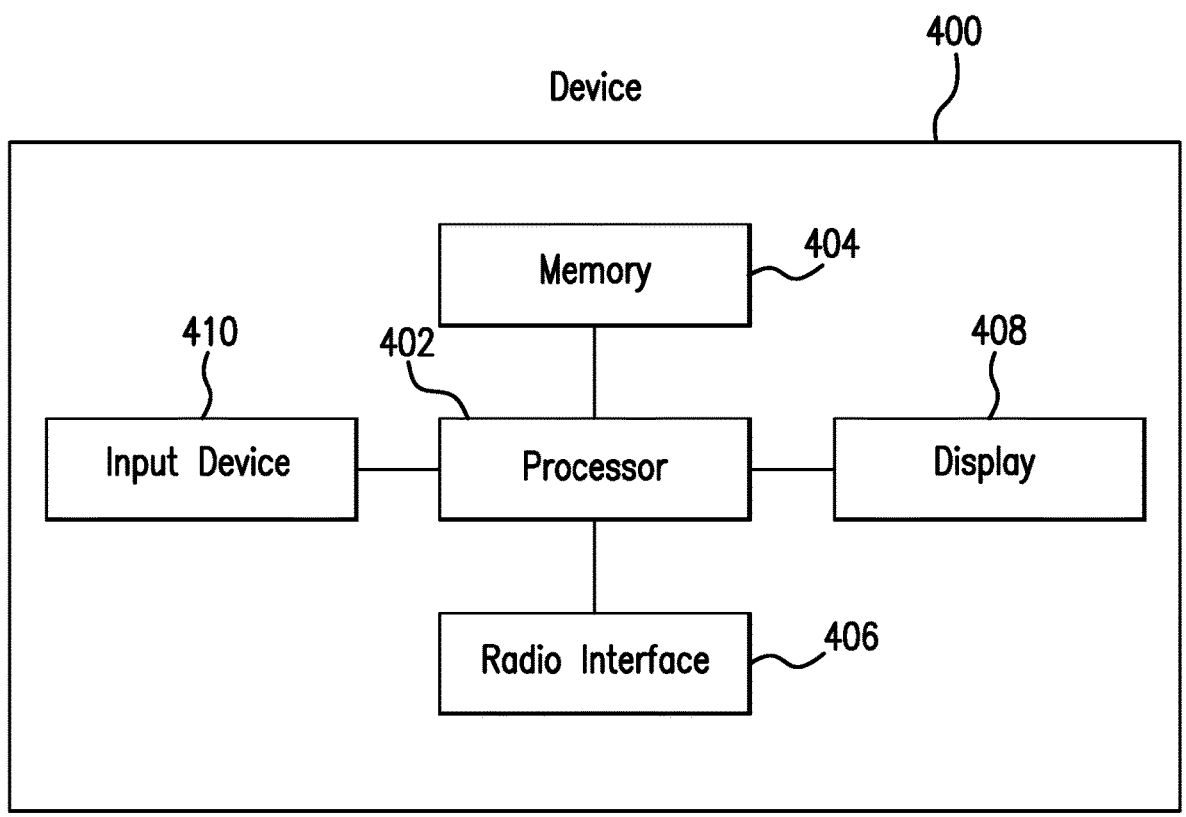
FIG. 4 is a device of the system of FIG. 1.

FIG. 4 illustrates a device 400 of the system 100 of FIG. 1. As described previously, a device 400 may be a mobile device of a driver of vehicle 102 or device 400 may be integrated into a vehicle 102. In this disclosure, when vehicle 102 is described as performing certain actions, it may be the case that device 400 of that vehicle 102 is performing that action. For example, device 400 may receive requests 204 from destinations 104, communicate information to other vehicles 102, receive information from other vehicles 102, and/or analyze information received from vehicles 102 and/or destinations 104. Device 400 may also determine the proximity of vehicles 102 to one another for the purposes of joining or leaving groups 202. In the example of FIG. 4, device 400 includes a processor 402, a memory 404, a radio interface 406, a display 408, and an input device 410. Generally, processor 402, memory 404, radio interface 406, display 408, and input device 410 may be configured to perform any of the functions of device 400 or vehicle 102 described herein.

Device 400 include any appropriate device for communicating with components of system 100. For example, device 400 may be a telephone, a mobile phone, a computer, a laptop, a tablet, an automated assistant, and/or a cash register. This disclosure contemplates device 400 being any appropriate device for sending and receiving communications. As an example and not by way of limitation, device 400 may be a computer, a laptop, a wireless or cellular telephone, an electronic notebook, a personal digital assistant, a tablet, or any other device capable of receiving, processing, storing, and/or communicating information with other components of system 100. Device 400 may also include a user interface, such as a display, a microphone, keypad, or other appropriate terminal equipment usable by a user. In some embodiments, an application executed by device 400 may perform the functions described herein.

Processor 402 is any electronic circuitry, including, but not limited to microprocessors, application specific integrated circuits (ASIC), application specific instruction set processor (ASIP), and/or state machines, that communicatively couples to memory 404 and controls the operation of device 400 and/or vehicle 102. Processor 402 may be 8-bit, 16-bit, 32-bit, 64-bit or of any other suitable architecture. Processor 402 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 402 may include other hardware that operates software to control and process information. Processor 402 executes software stored on memory to perform any of the functions described herein. Processor 402 controls the operation and administration of device 400 and/or vehicle 102 by processing information received from devices 400 and memory 404. Processor 402 may be a programmable logic device, a microcontroller, a microprocessor, any suitable processing device, or any suitable combination of the preceding. Processor 402 is not limited to a single processing device and may encompass multiple processing devices.

Memory 404 may store, either permanently or temporarily, data, operational software, or other information for processor 402 (e.g., routes, locations, traffic conditions, weather conditions, times to service 208, directions 210, group 202 information, etc.). Memory 404 may include any one or a combination of volatile or non-volatile local or remote devices suitable for storing information. For example, memory 404 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 404, a disk, a CD, or a flash drive. In particular embodiments, the software may include an application executable by processor 402 to perform one or more of the functions described herein.

Radio interface 406 may include any suitable components (e.g., antenna, radio, network interface card, etc.) that allows device 400 to send and receive messages. Device 400 may use radio interface 406 to communicate locations, routes, times to service 208, and other information to other vehicles 102 in system 100. Radio interface 406 may allow device 400 to communicate directly with other devices 400 in other vehicles 102 of a group 202. Radio interface 406 may allow device 400 to communicate messages through a network (e.g., cellular, mobile, or WiFi network) to other devices 400 or vehicles 102. Radio interface 406 may send received messages to processor 402, and radio interface 406 may broadcast or transmit messages received from processor 402.

Display 408 may be any suitable component that presents information visually. For example, display 408 may include a liquid crystal display, a light emitting diode display, a cathode ray tube display, etc. Display 408 may include adapters and drivers to translate signals received from processor 402 into a visual signal. Display 408 may present instructions and directions 210 from processor 402.

Input devices 410 may be any suitable component that presents input to device 400. For example, input devices 410 may include a keyboard, mouse, buttons, joystick, wheel, trackpad, optical sensor, infrared sensor, fingerprint sensor, camera, microphone, touchscreen, touch sensor, etc. A user (e.g. a driver) may use input devices 410 to communicate instructions to device 400. These instructions are communicated to processor 402 for processing.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A system comprising:
a first device assigned to a first vehicle and configured to control movement of the first vehicle, the first device comprising a first memory and a first hardware processor communicatively coupled to the first memory, the first memory configured to store a first location and a first route of the first vehicle;

a second device assigned to a second vehicle and configured to control movement of the second vehicle, the second device separate from the first device, the second device comprising a second memory and a second hardware processor communicatively coupled to the second memory, the second memory configured to store a second location and a second route of the second vehicle, wherein the first device and the second device are assigned to a first group based on the first location of the first vehicle, the second location of the second vehicle, a first type of the first vehicle, a second type of the second vehicle, a first time duration that the first vehicle has been in transit, and a second time duration that the second vehicle has been in transit, wherein the first type is different from the second type to maintain a diverse types of vehicles in the first group, wherein the first time duration is different from the second time duration to maintain a diverse set of vehicles with different amounts of usage in the first group to accommodate for maintenance of the vehicles in the first group; and a third device assigned to a third vehicle and configured to control movement of the third vehicle, the third device separate from the first device and the second device, the third device comprising a third memory and a third hardware processor communicatively coupled to the third memory, the third memory configured to store a third location and a third route of the third vehicle, wherein the third device is assigned to a second group different from the first group based on the third location of the third vehicle, wherein the third vehicle is currently assigned to deliver first supplies to a first destination, and is traveling to the first destination, the first hardware processor configured to:

receive a request broadcast from a second destination, wherein the request broadcast indicates that second supplies are needed at the second destination; and
  in response to receiving the request:
    determine, based on the first location of the first vehicle and the first route, a first time for the first vehicle to deliver the second supplies to the second destination; and
    transmit the first time to the second device;
    transmit information indicating members of the first group to the second device;
    transmit the information indicating members of the first group to the third device;

the second hardware processor configured to:
  receive the request broadcast from the second destination;
  receive the information regarding the members of the first group; and
  in response to receiving the request:
    determine, based on the second location of the second vehicle and the second route, a second time for the second vehicle to deliver the second supplies to the second destination;
    transmit the second time to the first device;
    receive the first time from the first device; and
    in response to receiving the first time from the first device, determine, based on the first time, the first type of the first vehicle, the second type of the second vehicle, the first time duration that the first vehicle has been in transit, the second time duration that the second vehicle has been in transit, and the second time, that the first vehicle rather than the second vehicle should deliver the second supplies to the second destination;

the first hardware processor further configured to:
  receive the second time from the second device;
  determine, based on the first time, the first type of the first vehicle, the second type of the second vehicle, the first time duration that the first vehicle has been in transit, the second time duration that the second vehicle has been in transit, and the second time, that the first vehicle rather than the second vehicle should deliver the second supplies to the second destination; and
  in response to determining that the first vehicle should deliver the second supplies to the second destination, control the movement of the first vehicle towards the second destination;

the third hardware processor configured to:
  receive the request broadcast from the second destination;
  receive the information regarding the members of the first group;
  determine that the third vehicle should deliver the second supplies to the second destination;
  in response to determining that the third vehicle should deliver the second supplies to the second destination, control the movement of the third vehicle towards the second destination, wherein as the third vehicle is traveling to the second destination, the third device is reassigned from the second group to the first group based on an updated location of the third vehicle, the first type of the first vehicle, the second type of the second vehicle, the first time duration that the first vehicle has been in transit, the second time duration that the second vehicle has been in transit; and
  in response to being reassigned to the first group, transmit a third time for the third vehicle to deliver the second supplies to the second destination to the first vehicle;

the first hardware processor further configured to:
  as the first vehicle is traveling to the second destination:
    receive the third time from the third vehicle;
    determine an updated location of the first vehicle;
    determine, based on the updated location of the first vehicle, a first new time for the first vehicle to deliver the second supplies to the second destination; and
    determine, based on the third time and the first new time, that the third vehicle rather than the first vehicle should deliver the second supplies to the second destination;

the third processor further configured to:
  receive the first new time from the first device;
  determine a second new time for the third vehicle to arrive at the first destination, wherein the second new time is determined based on an updated location of the third vehicle;
  determine, based on the third time, the first new time, and the second new time, that the third vehicle should deliver the second supplies to the second destination instead of delivering the first supplies to the first destination;
  reassign the third vehicle to deliver the second supplies to the second destination;
  cause the third vehicle to travel to the second destination;

communicate to the first device that the third vehicle is reassigned to deliver the second supplies to the second destination; and communicate to the second device that the third vehicle is reassigned to deliver the second supplies to the second destination, wherein one of the first vehicle and the second vehicle is selected to deliver the first supplies to the first destination based at least on the first new time of the first vehicle and a third new time of the second vehicle to reach the first destination, the third new time is determined based at least on an updated location of the second vehicle.

2. The system of claim 1, further comprising a fourth device, wherein the fourth device is assigned to the first group and the fourth device did not receive the request.

3. The system of claim 1, wherein:

The third hardware processor is further configured to:
as the third vehicle is traveling to the second destination, determine, based on a location of the third vehicle and a message from a fourth device assigned to a third group, that the third device should be assigned from the first group to the third group; and
in response to determining that the third device should be assigned to the third group, communicate a message to the fourth device indicating a location and a route of the third vehicle.

4. The system of claim 1, wherein the first vehicle and the second vehicle are autonomous, driverless vehicles.

5. The system of claim 1, wherein the first hardware processor is further configured to:
communicate the first location and the first route to the second device; and
receive the second location and the second route from the second device.

6. The system of claim 1, wherein:
the request indicates a depletion rate associated with the second supplies; and
the determination that the first vehicle should deliver the second supplies to the second destination is further based on the depletion rate.

7. The system of claim 1, wherein the first hardware processor is further configured to communicate, to the second device, traffic conditions experienced by the first vehicle.

8. A method comprising:
storing, by a first memory of a first device, a first location and a first route of a first vehicle, the first device assigned to the first vehicle and configured to control movement of the first vehicle, the first device comprising a first hardware processor communicatively coupled to the first memory;
storing, by a second memory of a second device, a second location and a second route of a second vehicle, the second device assigned to the second vehicle and configured to control movement of the second vehicle, the second device comprising a second hardware processor communicatively coupled to the second memory, wherein the first device and the second device are assigned to a first group based on the first location of the first vehicle, the second location of the second vehicle, a first type of the first vehicle, a second type of the second vehicle, a first time duration that the first vehicle has been in transit, and a second time duration that the second vehicle has been in transit, wherein the first type is different from the second type to maintain a diverse types of vehicles in the first group, wherein the first time duration is different from the second time duration to maintain a diverse set of vehicles with different amounts of usage in the first group to accommodate for maintenance of the vehicles in the first group;

storing, by a third memory of a third device, a third location and a third route of a third vehicle, the third device assigned to the third vehicle and configured to control movement of the third vehicle, the third device comprising a third hardware processor communicatively coupled to the third memory, wherein the third device is assigned to a second group different from the first group based on the third location of the third vehicle, wherein the third vehicle is currently assigned to deliver first supplies to a first destination, and is traveling to the first destination;

receiving, by the first hardware processor, receive a request broadcast from a second destination, wherein the request broadcast indicates that second supplies are needed at the second destination;

in response to receiving the request, determining, by the first hardware processor and based on the first location and the first route, a first time for the first vehicle to deliver the second supplies to the second destination;

transmitting, by the first hardware processor, the first time to the second device;

transmitting, by the first hardware processor, information indicating members of the first group to the second device;

transmitting, by the first hardware processor, the information indicating members of the first group to the third device;

receiving, by the second hardware processor, the request from the second destination;

receiving, by the second hardware processor, the information regarding the members of the first group;

in response to receiving the request, determining, by the second hardware processor and based on the second location and the second route, a second time for the second vehicle to deliver the second supplies to the second destination;

transmitting, by the second hardware processor, the second time to the first device;

receiving, by the second hardware processor, the first time from the first device;

determining, by the second hardware processor and based on the first time, the first type of the first vehicle, the second type of the second vehicle, the first time duration that the first vehicle has been in transit, the second time duration that the second vehicle has been in transit, and the second time, that the first vehicle rather than the second vehicle should deliver the second supplies to the second destination;

receiving, by the first hardware processor, the second time from the second device;

determining, by the first hardware processor and based on the first time, the first type of the first vehicle, the second type of the second vehicle, the first time duration that the first vehicle has been in transit, the second time duration that the second vehicle has been in transit, and the second time, that the first vehicle rather than the second vehicle should deliver the second supplies to the second destination;

in response to determining that the first vehicle should deliver the second supplies to the second destination, controlling, by the first hardware processor, movement of the first vehicle towards the second destination;

receiving, by the third hardware processor, the request;
receiving, by the third hardware processor, the information regarding the members of the first group;
in response to receiving the request, determining, by the third hardware processor, that the third vehicle should deliver the second supplies to the second destination;
in response to determining that the third vehicle should deliver the second supplies to the second destination, controlling, by the third hardware processor, the movement of the third vehicle towards the second destination, wherein as the third vehicle is traveling to the second destination, the third device is reassigned from the second group to the first group based on an updated location of the third vehicle, the first type of the first vehicle, the second type of the second vehicle, the first time duration that the first vehicle has been in transit, the second time duration that the second vehicle has been in transit;
in response to being reassigned to the first group, transmitting, by the third hardware processor, a third time for the third vehicle to deliver the second supplies to the second destination to the first vehicle;
as the first vehicle is traveling to the second destination:
  receiving, by the first hardware processor, the third time from the third vehicle;
  determining an updated location of the first vehicle;
  determining, by the first hardware processor and based on the updated location of the first vehicle, a new time for the first vehicle to deliver the second supplies to the second destination; and
  determining, by the first hardware processor and based on the third time and the new time, that the third vehicle rather than the first vehicle should deliver the second supplies to the second destination;
  receiving, by the first hardware processor, the first new time from the first device;
  determining, by the first hardware processor, a second new time for the third vehicle to arrive at the first destination, wherein the second new time is determined based on an updated location of the third vehicle;
  determining, by the first hardware processor and based on the third time, the first new time, and the second new time, that the third vehicle should deliver the second supplies to the second destination instead of delivering the first supplies to the first destination;
  reassigning, by the first hardware processor, the third vehicle to deliver the second supplies to the second destination;
  causing, by the first hardware processor, the third vehicle to travel to the second destination;
  communicating, by the first hardware processor, to the first device that the third vehicle is reassigned to deliver the second supplies to the second destination; and
  communicating, by the first hardware processor, to the second device that the third vehicle is reassigned to deliver the second supplies to the second destination,
wherein one of the first vehicle and the second vehicle is selected to deliver the first supplies to the first destination based at least on the first new time of the first vehicle and a first new time of the second vehicle to reach the first destination, the third new time is determined based at least on an updated location of the second vehicle.

9. The method of claim 8, wherein a fourth device is assigned to the first group and the fourth device does not receive the request.

10. The method of claim 8, further comprising:
as the third vehicle is traveling to the second destination, determining, by the third hardware processor and based on a location of the third vehicle and a message from a fourth device assigned to a third group, that the third device should be assigned from the first group to the third group; and
in response to determining that the third device should be assigned to the third group, communicating, by the third hardware processor, a message to the fourth device indicating a location and a route of the third vehicle.

11. The method of claim 8, wherein the first vehicle and the second vehicle are autonomous, driverless vehicles.

12. The method of claim 8, further comprising:
communicating, by the first hardware processor, the first location and the first route to the second device; and
receiving, by the first hardware processor, the second location and the second route from the second device.

13. The method of claim 8, wherein:
the request indicates a depletion rate associated with the second supplies; and
the determination that the first vehicle should deliver the second supplies to the second is further based on the depletion rate.

14. The method of claim 8, further comprising communicating, by the first hardware processor and to the second device, traffic conditions experienced by the first vehicle.

15. An apparatus comprising:
a first memory configured to store a first location and a first route of a first vehicle; and
a first hardware processor communicatively coupled to the first memory, the first hardware processor configured to:
  receive a request broadcast from a second destination, wherein the request broadcast indicates that second supplies are needed at a second destination;
  in response to receiving the request, determine, based on the first location and the first route, a first time for the first vehicle to deliver the second supplies to the second destination;
  transmit the first time to a second hardware processor assigned to a second vehicle, wherein the first vehicle and the second vehicle are assigned to a first group based on the first location of the first vehicle, a second location of the second vehicle, a first type of the first vehicle, a second type of the second vehicle, a first time duration that the first vehicle has been in transit, and a second time duration that the second vehicle has been in transit, wherein the first type is different from the second type to maintain a diverse types of vehicles in the first group, wherein the first time duration is different from the second time duration to maintain a diverse set of vehicles with different amounts of usage in the first group to accommodate for maintenance of the vehicles in the first group;
  transmit information indicating members of the first group to the second vehicle;
  transmit the information indicating members of the first group to a third vehicle;
  receive, from the second hardware processor, a second time for the second vehicle to deliver the second supplies to the second destination, the second time determined based on the second location and a second route of the second vehicle;
determine, based on the first time, the first type of the first vehicle, the second type of the second vehicle, the first time duration that the first vehicle has been in transit, the second time duration that the second vehicle has been in transit, and the second time, that the first vehicle rather than the second vehicle should deliver the second supplies to the second destination, wherein in response to receiving the first time, the second hardware processor determined, based on the first time, the first type of the first vehicle, the second type of the second vehicle, the first time duration that the first vehicle has been in transit, the second time duration that the second vehicle has been in transit, and the second time, that the first vehicle rather than the second vehicle should deliver the second supplies to the second destination;
in response to determining that the first vehicle should deliver the second supplies to the second destination, control movement of the first vehicle towards the second destination;
as the first vehicle is traveling towards the second destination:
receive a third time from the third vehicle, wherein as the third vehicle was traveling towards a first destination, wherein the third vehicle is currently assigned to deliver first supplies to the first destination, the third vehicle was reassigned from a second group to the first group based on a location of the third vehicle;
determine an updated location of the first vehicle;
determine, based on the updated location of the first vehicle, a new time for the first vehicle to deliver the second supplies to the second destination; and
determine, based on the third time and the new time, that the third vehicle rather than the first vehicle should deliver the second supplies to the second destination;
determine, based on the updated location of the first vehicle, a first new time for the first vehicle to deliver the second supplies to the second destination:
determine, based on an updated location of the third vehicle, a second new time for the third vehicle to arrive at the first destination;
determine, based on the third time, the first new time, and the second new time, that the third vehicle should deliver the second supplies to the second destination instead of delivering the first supplies to the first destination;
reassign the third vehicle to deliver the second supplies to the second destination;
cause the third vehicle to travel to the second destination;
communicate to a first device associated with the first vehicle that the third vehicle is reassigned to deliver the second supplies to the second destination; and
communicate to a second device associated with the second vehicle that the third vehicle is reassigned to deliver the second supplies to the second destination,
wherein one of the first vehicle and the second vehicle is selected to deliver the first supplies to the first destination based at least on the first new time of the first vehicle and a third new time of the second vehicle to reach the first destination, the third new time is determined based at least on an updated location of the second vehicle.

16. The apparatus of claim 15, wherein the first hardware processor is further configured to communicate, to the second hardware processor, traffic conditions experienced by the first vehicle.

17. The apparatus of claim 15, wherein:
the first hardware processor is further configured to:
as the first vehicle is traveling to the second destination, determine, based on a location of the first vehicle and a message from a fourth hardware processor assigned to a third group, that the fourth hardware processor should be assigned from the third group to the first group; and
in response to determining that the fourth hardware processor should be assigned to the first group, communicate a message to the fourth hardware processor indicating a location and a route of the first vehicle.

18. The apparatus of claim 15, wherein the first vehicle and the second vehicle are autonomous, driverless vehicles.

19. The apparatus of claim 15, wherein the first hardware processor is further configured to:
communicate the first location and the first route to the second hardware processor; and
receive the second location and the second route from the second hardware processor.

20. The apparatus of claim 15, wherein:
the request indicates a depletion rate associated with the second supplies; and
the determination that the first vehicle should deliver the second supplies to the second destination is further based on the depletion rate.

* * * * *